United States Patent
Asamoto et al.

(10) Patent No.: US 8,675,232 B2
(45) Date of Patent: Mar. 18, 2014

(54) INFORMATION PROCESSING SYSTEM, INFORMATION PROCESSING METHOD, INFORMATION PROCESSING APPARATUS AND RECORDING MEDIUM

(75) Inventors: Masahiro Asamoto, Tokyo (JP); Yasunao Mimura, Soka (JP); Hiroshi Hashimoto, Tokyo (JP); Aya Nagashima, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 154 days.

(21) Appl. No.: 13/274,035

(22) Filed: Oct. 14, 2011

(65) Prior Publication Data

US 2012/0099150 A1 Apr. 26, 2012

(30) Foreign Application Priority Data

Oct. 21, 2010 (JP) ................................. 2010-236910

(51) Int. Cl.
*G06F 3/12* (2006.01)
*G06K 15/00* (2006.01)
(52) U.S. Cl.
USPC ......................... 358/1.15; 358/1.13; 358/1.16

(58) Field of Classification Search
USPC .................... 358/1.1–1.9, 1.11–1.18; 709/221
See application file for complete search history.

(56) References Cited

U.S. PATENT DOCUMENTS

| 2009/0225365 A1* | 9/2009 | Hayakawa | .................... 358/1.15 |
| 2010/0005159 A1* | 1/2010 | Ishiguro | ........................ 709/221 |

FOREIGN PATENT DOCUMENTS

JP 2002279146 A 9/2002

* cited by examiner

*Primary Examiner* — King Poon
*Assistant Examiner* — Ibrahim Siddo
(74) *Attorney, Agent, or Firm* — Fitzpatrick, Cella, Harper & Scinto

(57) ABSTRACT

When a new application is filed in a workflow system, designation of image data to be attached to data included in the application is accepted. Then, when the image data to be attached to the data is insufficient, a scan ticket to be used when generating the image data to be attached to the data is generated. It is designated in the scan ticket to which data the generated image data is to be attached, and then the generated image data is actually attached to the data by a server apparatus according to such information.

10 Claims, 13 Drawing Sheets

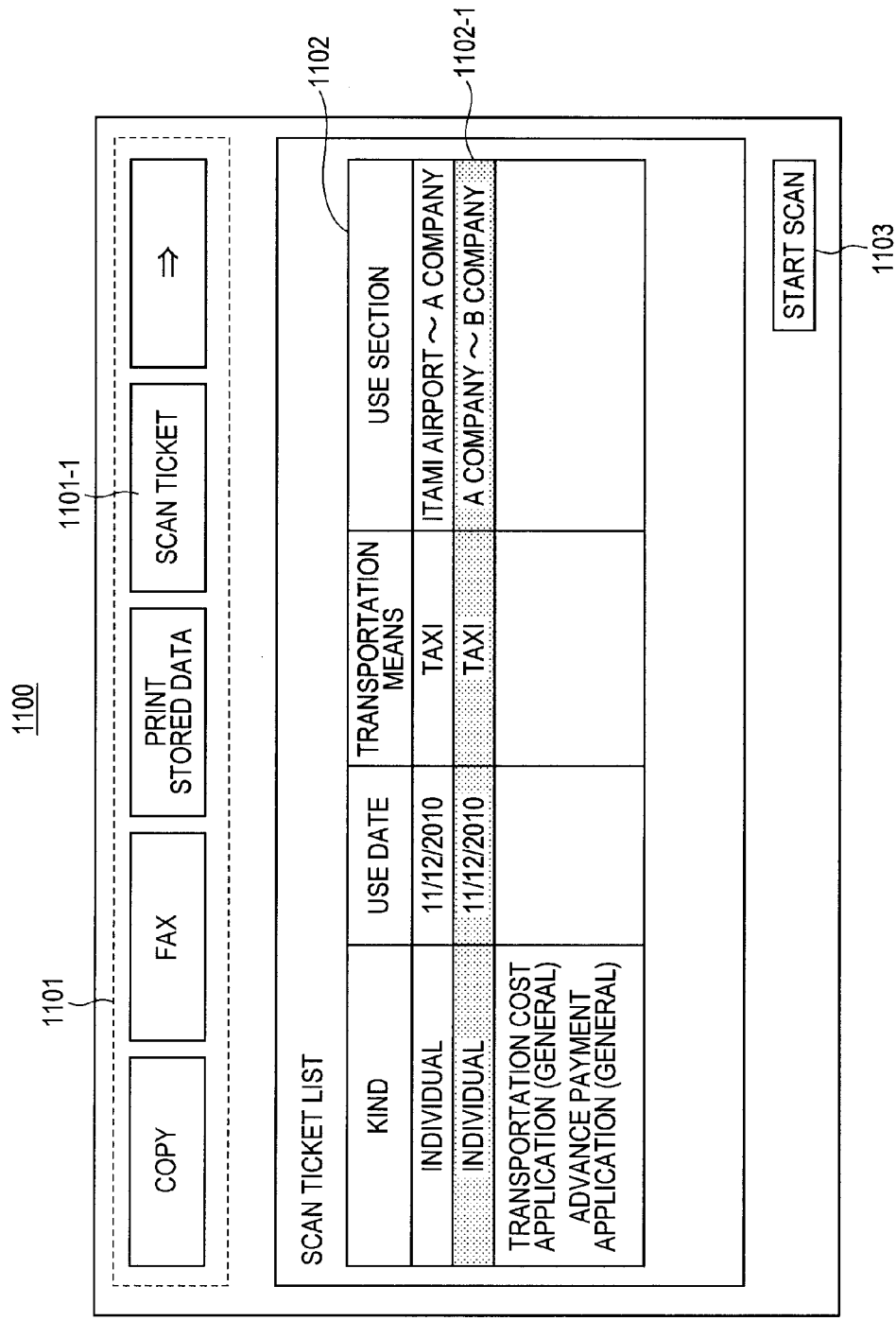

| SCAN TICKET ID | KIND | USER ID | SCAN SETTING | | | |
|---|---|---|---|---|---|---|
| | | | COLOR/ MONOCHROME | RESOLUTION | FILE FORMAT | FILE TRANSMISSION DESTINATION |
| | | | 1204-1 | 1204-2 | 1204-3 | 1204-4 |
| TK001 | TRANSPORTATION COST APPLICATION (GENERAL) | — | MONOCHROME | 150 dpi | TIFF | ¥¥Server¥TRANSPORTATION COST¥<USER> |
| TK002 | ADVANCE PAYMENT APPLICATION (GENERAL) | — | MONOCHROME | 300 dpi | PDF | ¥¥Server¥ADVANCE PAYMENT¥<USER> |
| ..... | ..... | ..... | ..... | ..... | ..... | ..... |
| TK101 | INDIVIDUAL | USER001 | MONOCHROME | 150 dpi | TIFF | ¥¥Server¥TRANSPORTATION COST¥USER001 |
| TK102 | INDIVIDUAL | USER001 | MONOCHROME | 150 dpi | TIFF | ¥¥Server¥TRANSPORTATION COST¥USER001 |

| USER ID 1301 | APPLICATION ID 1302 | DETAILED ID 1303 | USE DATE 1304 | TRANSPORTATION MEANS 1305 | USE SECTION 1306 | FARE 1307 | ROUND TRIP 1308 | SCAN TICKET ID 1309 | ATTACHMENT FILE 1310 |
|---|---|---|---|---|---|---|---|---|---|
| U0001 | A0001 | D0001 | 11/08/2010 | TRAIN | MITA~SHINJUKU | 520 | ○ | — | NOT REQUIRED |
| U0001 | A0001 | D0002 | 11/12/2010 | TRAIN | MITA~HANEDA | 800 | ○ | — | NOT REQUIRED |
| U0001 | A0001 | D0003 | 11/12/2010 | AIRPLANE (DOMESTIC) | HANEDA~ITAMI | 40,000 | ○ | — | TRANSPORTATION COST SCAN 1112-1... |
| U0001 | A0001 | D0004 | 11/12/2010 | TAXI | ITAMI AIRPORT ~A COMPANY | 2,500 | | TK101 | |
| U0001 | A0001 | D0005 | 11/12/2010 | TAXI | A COMPANY ~B COMPANY | 1,800 | | TK102 | |
| | ...... | ...... | ...... | ...... | ...... | ...... | ...... | | |

1300

INFORMATION PROCESSING SYSTEM, INFORMATION PROCESSING METHOD, INFORMATION PROCESSING APPARATUS AND RECORDING MEDIUM

BACKGROUND OF THE INVENTION

1. Field of the Invention

The present invention relates to a workflow system in which a computer is used, and, more particularly to a workflow system which performs a process to an application which requires an attached document.

2. Description of the Related Art

Conventionally, in a business workflow system which uses a computer, users apply for clearing transportation costs in their business trips and outside jobs. Generally, when a transportation means such as a train, a bus or the like is used in the business trip or the outside job, an accounting process is performed for its transportation costs only by an application on the workflow system. However, when a transportation means such as a taxi, a bullet train (superexpress train) or an airplane is used in the business trip or the outside job, there is a case where it is required in the accounting process to file a receipt concerning the relevant transportation means. Therefore, in the case where it is required to file the receipt, after the user applies for clearing the transportation costs in the conventional business workflow system, he/she pastes up the required receipt on a mounting paper and directly files the pasted receipt.

In this connection, Japanese Patent Application Laid-Open No. 2002-279146 discloses a technique which is applicable to a case where an application for clearing a transportation cost is performed in a workflow system. More specifically, in this workflow system, it is automatically determined whether or not the application is an application for which a receipt is required, a mounting paper on which the receipt should be pasted is printed and output when it is determined that the application is the application for which the receipt is required, the receipt is pasted up on the printed mounting paper, and the receipt pasted on the mounting paper is actually filed as a paper document by an applicant. In this technique, a bar code by which an application number concerning the application for clearing the transportation cost can be identified is printed on a dedicated mounting paper to be printed and output. For this reason, in an accounting department to which the mounting paper having the receipt thereon has been filed, it is possible to easily match the application number described on the filed receipt with the previously recorded number by reading the printed bar code by means of a bar code reader.

However, in the technique disclosed in Japanese Patent Application Laid-Open No. 2002-279146, although the application is electronically accepted by the workflow system, the receipt required for approval is later received directly from the applicant. Therefore, in this technique, such an accounting process is not necessarily sped up and not made efficient despite the workflow system installed.

With respect to the above-described matter, for example, if the receipt is read by a scanner of a multifunction machine, electronic image data indicating the read receipt is generated by a digitizing function of the multifunction machine, and the generated electronic image data is attached to the application to be performed in the workflow system, whereby it is expected to further speed up the process and make the process further efficient.

In this case, the applicant who performs the application for clearing the transportation cost has to perform the operation of digitizing the receipt by the multifunction machine and then attaching the digitized receipt (attachment data) to the application (application data). Here, it is conceivable that the applicant generates the attachment data before or after starting the application in the workflow system. Therefore, it is important to provide a mechanism which can appropriately attach the attachment data to the application data in the workflow system both before and after starting the application.

To make the operation efficient in the application, if it is insufficient only to easily attach the attachment data generated before the application is started to the application data, it is desirable to cause a user to appropriately attach, to the application data, the attachment data obtained by digitizing the image data of the receipt with the multifunction machine after the application is started, without explicitly instructing to which the application data the attachment data should be attached.

SUMMARY OF THE INVENTION

The present invention has been completed in consideration of such a problem as described above, and an object thereof is to provide a workflow system which can suppress a human-caused error in case of attaching an attachment document required in an application in the workflow system.

Here, in an aspect of the present invention, there is provided an information processing system which includes a management server and an image processing apparatus having an image reading mechanism, wherein: the management server comprises a first accepting unit adapted to accept data from a client apparatus, a first determining unit adapted to determine whether or not there is an attachment file to be attached to the data accepted by the first accepting unit, a first generating unit adapted to, in a case where it is determined by the first determining unit that there is no attachment file to be attached to the data accepted by the first accepting unit, generate a scan ticket to be used in case of attaching the attachment file to the data, an associating unit adapted to associate the scan ticket generated by the first generating unit with data to which an image file generated using the scan ticket is attached, and a first transmitting unit adapted to transmit the scan ticket to the image processing apparatus in response to a request from the image processing apparatus; the image processing apparatus comprises a request unit adapted to transmit the request of the scan ticket to the management server, a second accepting unit adapted to accept, from among the scan tickets capable of being used by a user who operates the image processing apparatus, designation of the scan ticket to be used in an image reading process, a second generating unit adapted to perform the image reading process with the image reading mechanism by using the scan ticket accepted by the second accepting unit, and generate image data, and a second transmitting unit adapted to transmit the image data generated by the second generating unit to a designated transmission destination; and the management server further comprises an attaching unit adapted to attach the image data transmitted from the image processing apparatus to the data associated with the scan ticket used in the generating of the image data.

Further features of the present invention will become apparent from the following description of exemplary embodiments with reference to the attached drawings.

BRIEF DESCRIPTION OF THE DRAWINGS

FIG. 11 is a view illustrating an example of an operation screen to be displayed on an LCD (liquid crystal display) unit of the multifunction machine 103.

FIG. 12 is a view illustrating an example of a data constitution of a scan ticket data table to be stored in an external memory 211 of the server apparatus 101.

FIG. 13 is a view illustrating an example of a data constitution of a transportation cost application data table to be stored in the external memory 211 of the server apparatus 101.

DESCRIPTION OF THE EMBODIMENTS

Hereinafter, embodiments of the present invention will be described with reference to the attached drawings.

Figure 1:
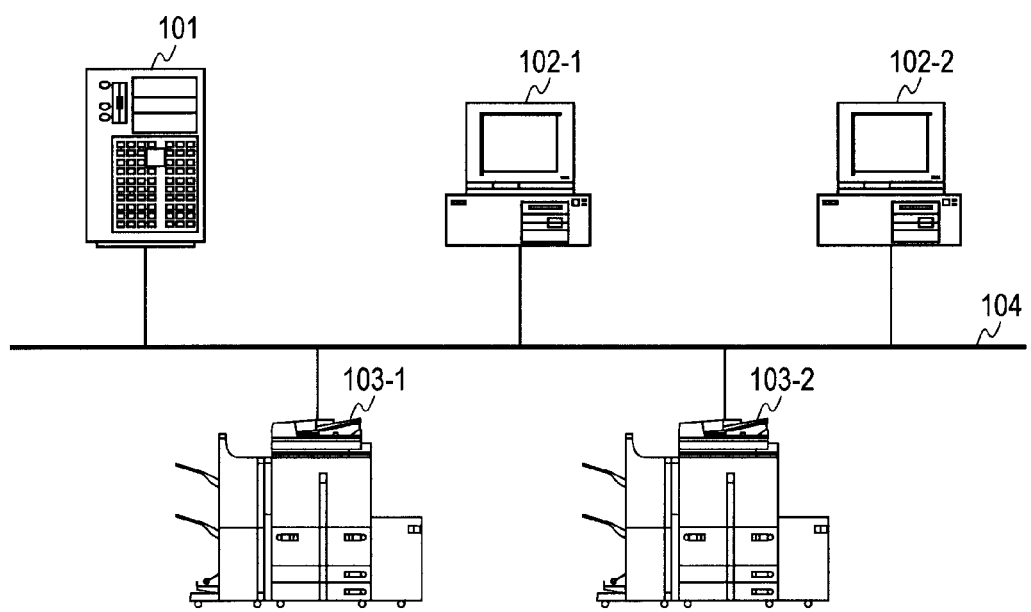
FIG. 1 is a schematic view illustrating an example of a system configuration of a workflow system according to the present invention.

FIG. 1 is a schematic view illustrating an example of a system configuration of an information processing system according to the present invention. Here, the information processing system according to the present invention is constituted so as to include image processing apparatuses such as a server apparatus 101, client apparatuses 102-1 and 102-2 (hereinafter, collectively called a client apparatus 102), multifunction machines 103-1 and 103-2 (hereinafter, collectively called a multifunction machine 103) and the like, a LAN (local area network) 104, and the like.

The server apparatus 101 accepts a start request of a specific workflow from the client apparatus 102, and thus generate workflow processing data of a type for which the start request was accepted. Further, when an attachment document such as a receipt of a taxi or the like in, e.g., an application for clearing transportation cost is required to the workflow of which the start request was accepted, the server apparatus 101 also creates a scan ticket.

Here, the scan ticket is the data which is used in the image processing apparatus when electronic image data (attachment data) to be attached to various processing data (application data) in the workflow is generated. When the electronic image data is generated, scanner settings such as resolution, a color setting and the like in case of reading a paper document or the like using a scanner function of the multifunction machine 103, a file format of the electronic image data to be generated, a registration destination of the electronic image data to be generated, application data of the workflow to which the electronic image data generated by a scanning process using the scan ticket is to be attached, and the like are defined on the scan ticket. Here, it should be noted that the scan ticket may also be called scan ticket data. In any case, the data constitution of the scan ticket data will later be described with reference to FIG. 12. Incidentally, the function to issue the scan ticket and the function to manage the workflow data may be provided respectively by different server apparatuses. Further, the server apparatus 101 identifies, according to the scan ticket data, the process to be performed when use of the scan ticket data ends, and then actually performs the identified process. In the present embodiment, an example of advancing an application process by the workflow to a next activity will be described. However, the process to be performed when the use of the scan ticket data ends is not limited to this. Namely, a mail transmission process or the like may be performed.

The client apparatus 102 is the terminal apparatus which is used by a user who performs various applications with the workflow system. The client apparatus 102 transmits, to the server apparatus 101, various application requests by the workflow function provided by the server apparatus 101, according to operation instructions input by the user using the input unit. On this occasion, the client apparatus 102 accepts an input instruction which is necessary for the setting of the scan ticket used to generate the electronic image data indicating an item of the application, a document such as the receipt or the like attached to the application by the operations of the user using the input unit, and transmits the application request and a scan ticket issuance request according to the input instructions to the server apparatus 101. Subsequently, the server apparatus 101 generates new application data in response to the application request.

The multifunction machine 103 is the image processing apparatus which is used in the generation process of the electronic image data indicating documents (e.g., receipt) to be attached to various applications. When the electronic image data indicating the document to be attached to the application is generated, the multifunction machine 103 requests the scan ticket corresponding to the user to the server apparatus 101. Then, the multifunction machine 103 accepts, from the user, a selection instruction of the scan ticket obtained from the server apparatus 101, and performs the generation process of the electronic image data indicating the document according to the scanner setting set in the selected scan ticket. Incidentally, the generated electronic image data is stored in the registration destination set in the scan ticket.

The LAN 104 is the communication network which is used to mutually and communicably connect the server apparatus 101, the client apparatus 102 and the multifunction machine 103 with others. These are the example of the system configuration of the information processing system according to the present invention.

Subsequently, an example of a hardware constitution of an information processing apparatus which is applicable to the server apparatus 101 illustrated in FIG. 1 will be described with reference to FIG. 2.

Figure 2:
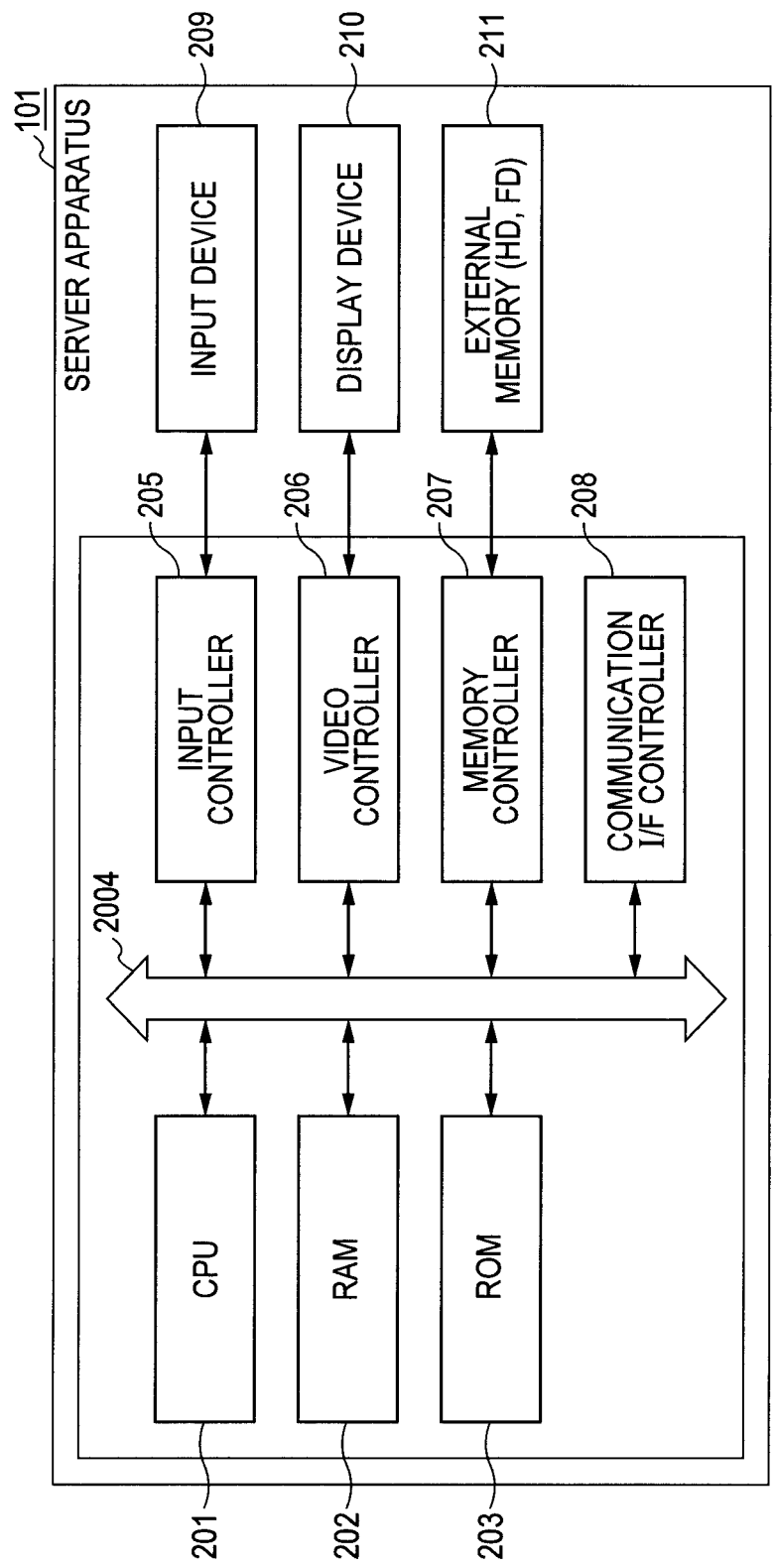
FIG. 2 is a block diagram illustrating an example of a hardware constitution of an information processing apparatus which is applicable as a server apparatus 101 in the workflow system of the present invention.

In FIG. 2, a CPU (central processing unit) 201 totally controls devices and controllers respectively connected to a system bus 204. Incidentally, BIOS (Basic Input/Output System) serving as a control program for the CPU 201, an OS (operating system) also serving as a control program, later-described various programs necessary to achieve functions to be performed by each server, each PC (personal computer) and the like, and the like are stored in a ROM (read only memory) 203 or an external memory 211.

A RAM (random access memory) 202 serves as a main memory, a working area and the like for the CPU 201. In case of performing a process, the CPU 201 loads a program or the like necessary for the process from the ROM 203 or the external memory 211 to the RAM 202, and then executes the loaded program or the like to perform the process to achieve various operations.

An input controller 205 controls inputs from an input device 209 such as a keyboard, a pointing device, and the like. A video controller 206 controls display to be performed on a display device such as a display device 210 or the like. Incidentally, these devices are used by an operator as necessary.

A memory controller 207 controls access to the external memory 211 such as an HD (hard disk), an FD (flexible disk), a CompactFlash™ memory connected to a PCMCIA (Personal Computer Memory Card International Association) card slot through an adapter, or the like, which stores a boot program, various applications, font data, user files, edit files, various data and the like.

A communication I/F (interface) controller 208, which connects to and communicates with an external apparatus through a network (for example, the LAN 104 illustrated in FIG. 1), performs a communication control process on the network. For example, the communication I/F controller 208 can perform communication using TCP/IP (Transmission Control Protocol/Internet Protocol).

Incidentally, the CPU 201 enables display on the display device 210 by, for example, performing an extracting (rasterizing) process of an outline font to a display information region in the RAM 202. Further, the CPU 201 enables a user instruction using a not-illustrated mouse cursor on the display device 210.

Processes of respective steps illustrated in later-described flow charts for achieving the present invention are performed by programs capable of being read and executed by a computer, and these programs have been stored in the external memory 211. Then, these programs are loaded to the RAM 202 as necessary, and the loaded programs are executed by the CPU 201. Moreover, definition files to be used when the above programs are executed, various information tables, and the like have been stored also in the external memory 211. In any case, the definition files and the various information tables will later be described in detail.

Incidentally, the client apparatus 102 illustrated in FIG. 1 has the hardware constitution substantially same as that of the server apparatus 101, whereby detailed description thereof will be omitted.

Subsequently, a hardware constitution of the multifunction machine 103 illustrated in FIG. 3 will be described with reference to FIG. 3. Namely, FIG. 3 is the block diagram illustrating an example of the hardware constitution of the multifunction machine 103 illustrated in FIG. 1.

Figure 3:
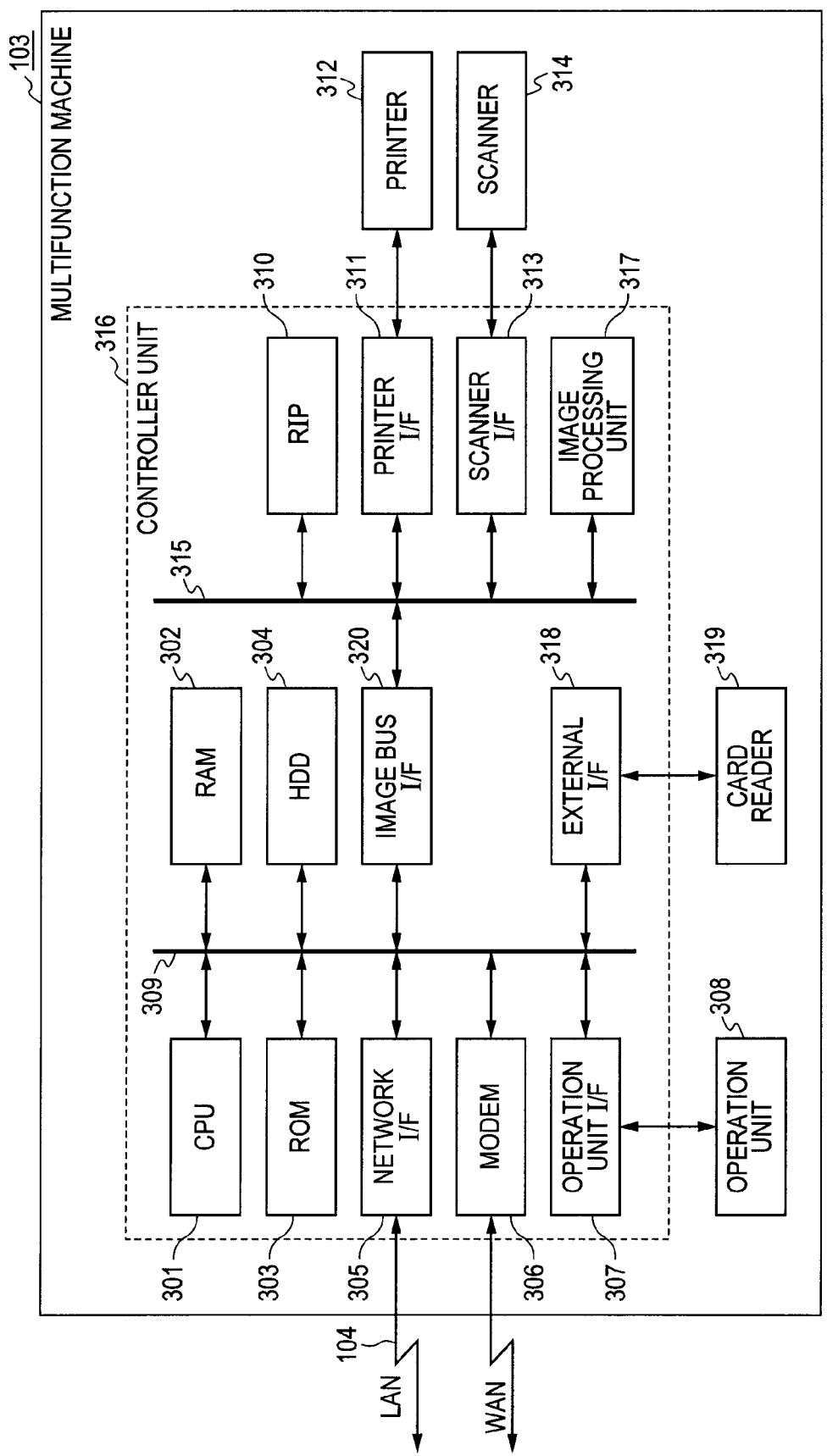
FIG. 3 is a block diagram illustrating an example of a hardware constitution of a multifunction machine 103 in the workflow system of the present invention.

In FIG. 3, a controller unit 316 is connected to a scanner 314 functioning as an image input device and a printer 312 functioning as an image output device, and is, on the other hand, connected to the LAN 104 and a WAN (wide area network) such as a PSTN (public switched telephone network), an ISDN (Integrated Services Digital Network) or the like, thereby inputting and outputting electronic image data and device information.

In the controller unit 316, a CPU 301 is the processor which wholly controls the system, and a RAM 302 is the system working memory to be used when the CPU 301 operates. Also, the RAM 302 serves as the program memory for recording programs and the image memory for temporarily storing image data.

A ROM 303 stores therein a boot program and various control programs for the system. An HDD (hard disk drive) 304 stores therein various programs for controlling the system, image data, and the like.

An operation unit I/F 307 is the interface unit for an operation unit 308. Also, the operation unit I/F 307 functions to transfer, to the CPU 301, key information (e.g., depression of a start button) input from the operation unit 308.

A network I/F 305, which is connected to a network such as the LAN 104 or the like, inputs and outputs data. A modem 306, which is connected to the WAN, inputs and outputs facsimile transmission and reception data.

An external I/F 318 is the interface unit which accepts external inputs such as inputs from a USB (universal serial bus), an IEEE (Institute of Electrical and Electronics Engineers) 1394, a printer port, an RS-232C (Recommended Standard 232 version C), and the like. In the present embodiment, a card reader 319 for reading a non-contact IC card (storage medium) necessary for user authentication is connected to the external I/F 318. Then, the CPU 301 controls information reading from the IC card by the card reader 319 through the external I/F 318, whereby it is possible to obtain information read from the IC card. The above-described devices are disposed on a system bus 309.

An image bus I/F 320 is the bus bridge which connects the system bus 309 to an image bus 315 for transferring electronic image data at high speed, and thus converts a data structure. Here, the image bus 315 is constituted by a PCI (Peripheral Component Interconnect) bus or an IEEE 1394 bus. In any case, the following devices are disposed on the image bus 315.

An RIP (raster image processor) 310 extracts vector data such as a PDL (page description language) code or the like into bit map image data. A printer I/F 311 connects the printer 312 to the controller unit 316, and thus performs synchronous/asynchronous conversion for electronic image data. A scanner I/F 313 connects the scanner 314 to the controller unit 316, and thus performs synchronous/asynchronous conversion for image data.

An image processing unit 317 corrects, processes and edits input image data. Further, the image processing unit 317 performs printer correction, resolution conversion and the like to print output image data. Furthermore, the image processing unit 317 performs rotation of electronic image data, compression and extraction processes to multivalued image data according to a JPEG (Joint Photographic Experts Group) format, and compression and extraction processes to binary image data according to a JBIG (Joint Bi-level Image experts Group), MMR (Modified Modified READ (Relative Element. Address Designate)) or MH (Modified Huffman) format. Moreover, the image processing unit 317 can perform an image process to the electronic image data read by driving the scanner 314, convert the processed electronic image data to have a format (e.g., PDF file format) capable of being output as a file, and transmit the obtained file of the electronic image data to an external device through the network I/F 305 in collaboration with the CPU 301.

The scanner 314 converts an image on a paper original into an electrical signal as raster image data, by irradiating the image and then scanning it with a CCD (charge-coupled device) line sensor. After the paper original was set on a tray of a document feeder, when a reading start instruction by the user is issued from the operation unit 308, the CPU 301 instructs the scanner 314 to cause the document feeder to feed and read the paper original one by one, thereby performing an original image reading operation.

The printer 312 is the unit for converting the raster image data into an image on a paper, in an electrophotographic method using a photosensitive drum, a photosensitive belt or the like, an inkjet method of directly printing the image on the paper by discharging inks from a micro-nozzle array, or the like. Such a print operation is started in response to an instruction from the CPU 301. Incidentally, the printer 312 has plural paper feeding stages for enabling the user to select different paper sizes and/or different paper directions, and plural paper cassettes respectively corresponding to the plural paper feeding stages.

The operation unit 308 has an LCD unit on which a touch panel sheet has been applied to display the system operation screen, and transfers, when the displayed key is depressed, position information indicating the position of the depressed key to the CPU 301 through the operation unit I/F 307. Here, various operation keys provided on the operation unit 308 include, for example, a start key, a stop key, an ID key, a reset key, and the like.

Incidentally, it should be noted that displaying performance of the LCD unit is different according to a kind of printer. In the present invention, a printer which can be operated through a touch panel, and a printer which is equipped with a liquid crystal screen to merely display character strings (displaying a printing state, a name of an in-printing document, and the like) are used.

Here, the start key on the operation unit 308 is used to start a reading operation of an original image. Two LEDs (light-emitting diodes) consisting of green and red LEDs are provided at the center of the start key, so as to indicate based on a color thereof whether the start key is in a usable state. The stop key on the operation unit 308 is used to stop the operation which is being performed, the ID key on the operation unit 308 is used to input a user ID of a user, and the reset key is used to initialize the setting from the operation unit.

Under the control of the CPU 301, the card reader 319 reads the information stored in the non-contact IC card, and notifies the CPU 301 of the read information through the external I/F 318.

By the above constitution of the multifunction machine 103, the electronic image data generated by reading the document with the scanner 314 can be transmitted to the LAN 104, and the print data received from the LAN 104 can be printed and output by the printer 312.

Moreover, the electronic image data generated by reading the document with the scanner 314 can be facsimile-transmitted to the WAN by the modem 306, and the electronic image data facsimile-received from the WAN can be output by the printer 312. These are the example of the hardware constitution of the multifunction machine 103 illustrated in FIG. 1.

Figure 4:
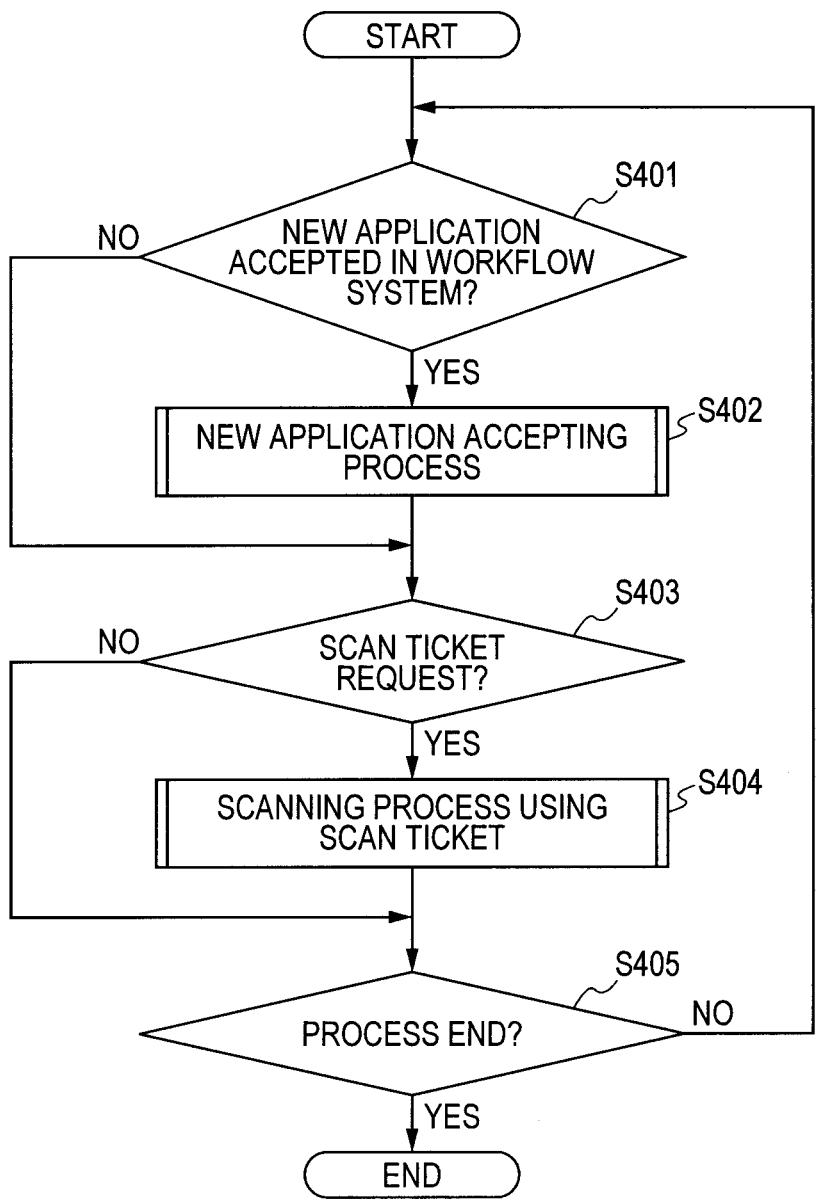
FIG. 4 is a flow chart illustrating an outline of a process to be performed by the workflow system according to the present invention.

Subsequently, an outline of the process to be performed by the server apparatus 101 will be described with reference to FIG. 4. Incidentally, the program for causing the CPU 201 of the server apparatus 101 to perform the above process has been stored in the external memory 211, and this program is downloaded to the RAM 202 by the CPU 201 as necessary, whereby the above process is actually performed under the control of the downloaded program.

In a case where the above process is being performed, the CPU 201 always accepts various new applications from the client apparatus 102 in the workflow system, and a scan ticket request from the multifunction machine 103.

When the new application from the client apparatus 102 is accepted (YES in a step S401), the process is moved by the CPU 201 to a step S402 to perform a new application accepting process by the CPU 201 of the server apparatus 101 and the CPU of the client apparatus 102. The detail of the new application accepting process will later be described in detail with reference to FIG. 5.

When the scan ticket request is accepted from the multifunction machine 103 (YES in a step S403), the process is moved by the CPU 201 to a step S404 to perform a scanning process using the scan ticket by the CPU 201 of the server apparatus 101 and the CPU 301 of the multifunction machine 103. The detail of the scanning process will later be described in detail with reference to FIG. 8. Incidentally, when an instruction issued by depressing a scan ticket button 1101-1 on an operation screen 1100 (FIG. 11) displayed on the LCD unit, the multifunction machine 103 transmits the scan request using the scan ticket to the server apparatus 101. The configuration of the operation screen 1100 will later be described. Then, the above processes are repeatedly performed until it is determined by the CPU 201 that the whole process illustrated in FIG. 4 ends (YES in a step S405). These are the outline of the processes to be performed by the server apparatus 101.

Figure 5:
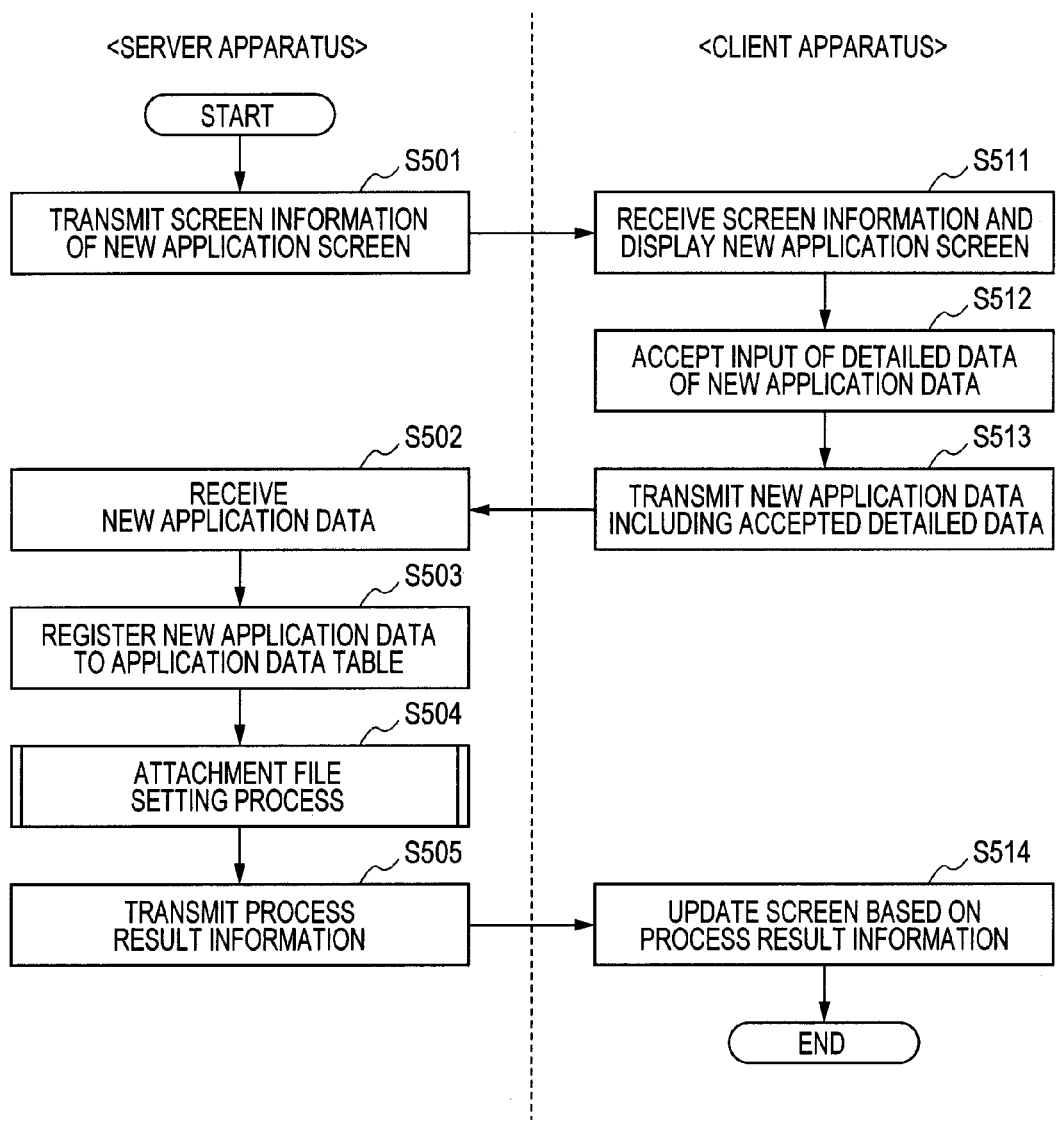
FIG. 5 is a flow chart illustrating the detail of a new application accepting process of a step S402 illustrated in FIG. 4.

Subsequently, the new application accepting process of the step S402 illustrated in FIG. 4 will be described in detail with reference to FIG. 5. Here, FIG. 5 is the flow chart illustrating the detail of the new application accepting process. Incidentally, the program, stored in the external memory 211, for causing the CPU 201 of the server apparatus 101 to perform processes of steps S501 to S505 is loaded to the RAM 202, and these processes are actually performed by the CPU 201 under the control of the loaded program. Likewise, the program, stored in the external memory 211, for causing the CPU 201 of the client apparatus 102 to perform processes of steps S511 to S514 is loaded to the RAM 202, and these processes are actually performed by the CPU 201 of the client apparatus 102 under the control of the loaded program.

Initially, in a not-illustrated step, an authentication process is performed for the user who operates the client apparatus 102 from which a new application (here, assumed as a new application for clearing transportation costs) has been requested. When the authentication process ends, screen information for causing the display device 210 of the client apparatus 102 to display a new application screen 900 is transmitted from the CPU 201 of the server apparatus 101 to the client apparatus 102 from which the new application has been requested (step S501). Then, when the screen information is received by the client apparatus 102, the new application screen 900 is displayed on the display device 210 of the client apparatus 102 according to the screen information (step S511).

Figure 9:
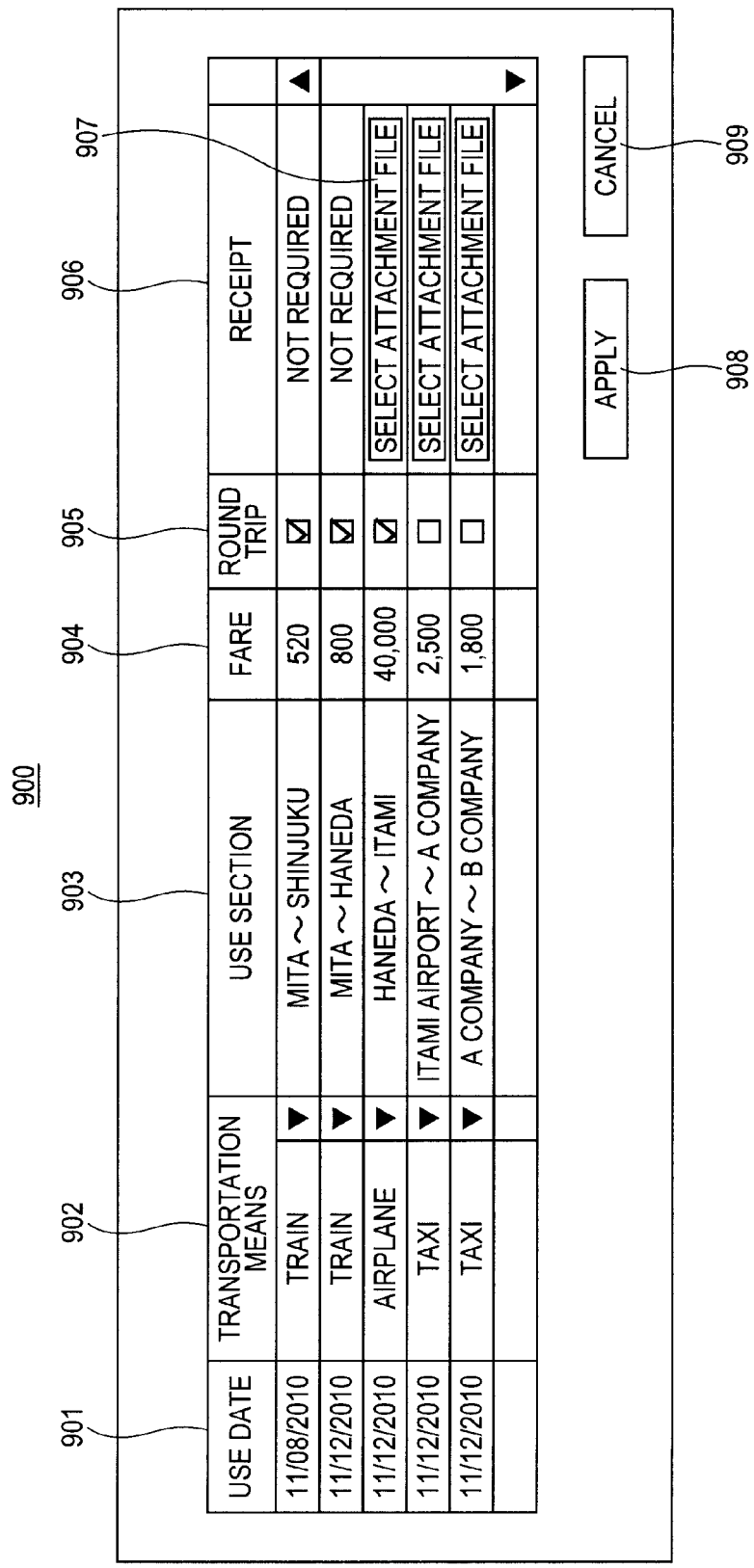
FIG. 9 is a view illustrating an example of a new application screen to be displayed on a display device of a client apparatus 102.

Here, an example of a configuration of the new application screen 900 for clearing the transportation costs to be displayed on the display device 210 of the client apparatus 102 in the step S511 of FIG. 5 will be described. As illustrated in FIG. 9, a use date input section 901, a transportation means designation section 902, a use section input section 903, a fare input section 904, a round trip designation section 905, a receipt designation section 906, an application button 908 and a cancel button 909 are set on the new application screen 900. Moreover, an attachment file selection button 907 is set in the receipt designation section 906 according to the designation in regard to the transportation means designation section 902. With respect to such items as described above, an input is accepted for each detailed data included in the new application.

The use date input section 901 is the section to which a use date of the transportation means is input. The transportation means designation section 902 is the designation section in which the used transportation means is selected and designated. In the present embodiment, a train, a bullet train (super-express train), a bus, an airplane, a taxi and the like can be designated in this designation section. In any case, the applicant is required to attach the electronic image data of the receipt when the bullet train, the airplane or the taxi is designated.

The use section input section 903 is the input section to which a traffic section while which the applicant used the transportation means is input. The fare input section 904 is the input section to which a fare paid to use the transportation means is input. The round trip designation section 905 is the designation section in which designation concerning whether the detailed data of the application for clearing the transportation cost corresponds to a one-way trip (not checked) or a round trip (checked) is input.

When the transportation means (the bullet train, the airplane, or the taxi) for which the electronic image data of the receipt is required is designated in the transportation means designation section 902, the attachment file selection button 907 to be used to attach the electronic image data is displayed in the receipt designation section 906. When an instruction issued by depressing the attachment file selection button 907 is accepted, it is controlled by the CPU 201 of the client apparatus 102 to cause the display device 210 to display an attachment file setting screen 1000 illustrated in FIG. 10. The attachment file setting screen 1000 will later be described with reference to FIG. 10.

The application button 908 is the button to be used to transmit the new application data for clearing the transportation cost input through the new application screen to the server apparatus 101. The cancel button 909 is the button to be used to terminate the new application screen without transmitting the new application data to the server apparatus 101. These are the example of the new application screen 900. Incidentally, it should be noted that a plurality of new applications for clearing transportation costs can be performed at a time. In such a case, the user (applicant) may perform the applications by inputting the plurality of detailed data as illustrated in FIG. 9.

Subsequently, the configuration of the attachment file setting screen 1000 to be displayed on the display device 210 of the client apparatus 102 will be described with reference to FIG. 10. Here, it should be noted that the attachment file setting screen 1000 is the screen to be displayed on the display device 210 of the client apparatus 102 by accepting an instruction issued by depressing the attachment file selection button 907 on the new application screen 900 illustrated in FIG. 9.

Figure 10:
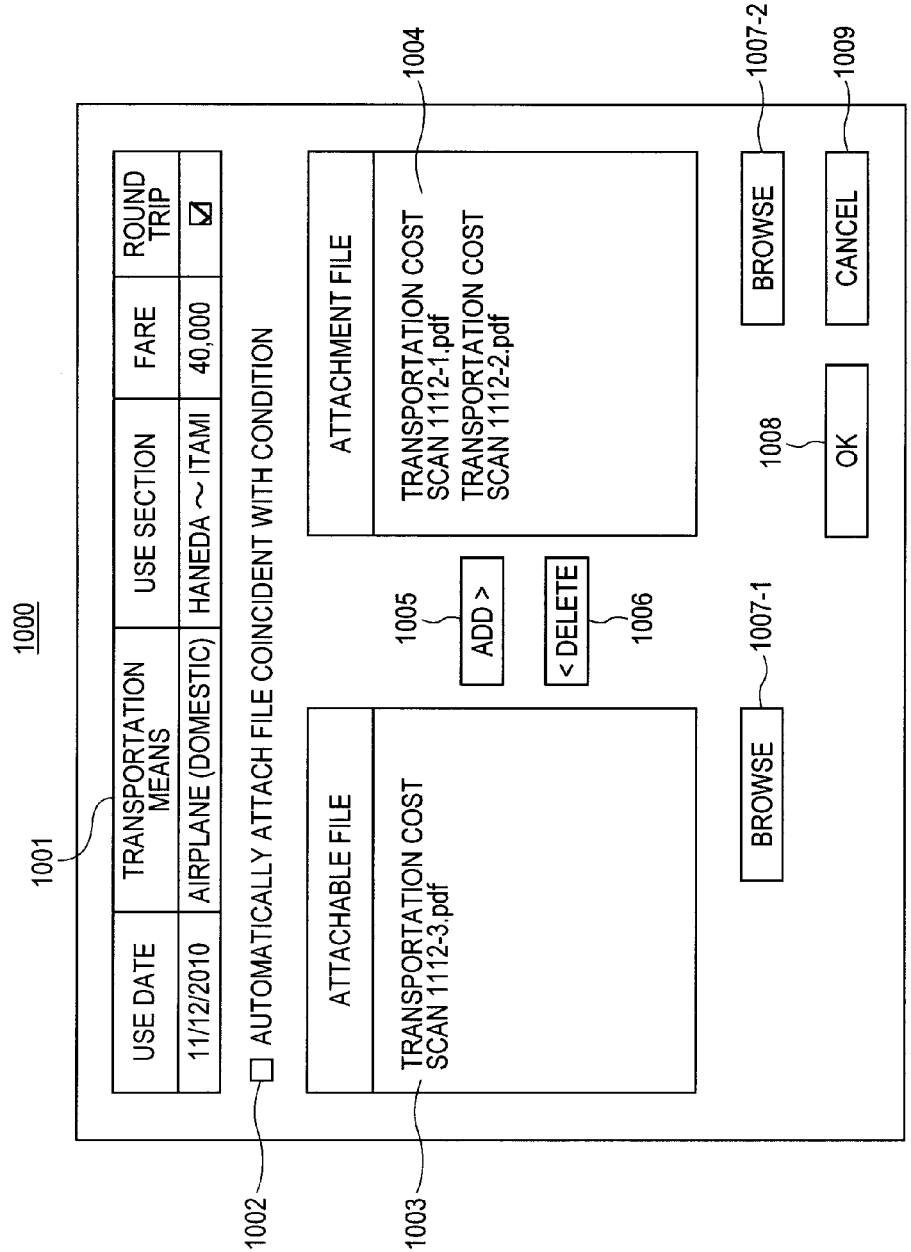
FIG. 10 is a view illustrating an example of an attachment file setting screen to be displayed on the display device of the client apparatus 102.

As illustrated in FIG. 10, an application detailed data display section 1001, a receipt image data automatic attachment designation section 1002, an attachable file display section 1003, an attachment file display section 1004, an add button 1005, a delete button 1006, browse buttons 1007-1 and 1007-2, an OK button 1008 and a cancel button 1009 are set on the attachment file setting screen 1000.

More specifically, detailed data included in transportation cost application data to be input to the row on which the attachment file selection button 907 depressed and instructed in FIG. 9 is displayed is displayed in the application detailed data display section 1001. The receipt image data automatic attachment designation section 1002 is the designation section for designating whether to automatically set the electronic image data being the attachment file of the detailed data (checked) or not (not checked). In any case, an automatic setting process of the attachment file will be described later. In the attachable file display section 1003, a list of the electronic image data stored in a specific folder of the server apparatus 101 is displayed. Here, the folder for storing the electronic image data attachable to the transportation cost application data allocated to each of the users is set to the server apparatus, and the list of the electronic image data stored in the folder allocated to the user identified by the user authentication is displayed in the attachable file display section 1003. Incidentally, the electronic image data already attached to another detailed data is not displayed in this section. Alternatively, it is controlled so as not to be able to select the electronic image data already attached to another detailed data even if the relevant data is displayed in this section. Here, it is of course possible to accept selection of an arbitrary folder in which the electronic image data has been stored and thus accept the electronic image data stored in the selected arbitrary folder as the attachment file.

In the attachment file display section 1004, a list of the electronic image data to which the designation to attach it to the detailed data has been accepted is displayed. Here, such the attachment file is designated by accepting the designation by means of the add button 1005 in the state that any of the electronic image data in the list displayed in the attachable file display section 1003 is being selected. Incidentally, the electronic image data to which the designation to attach it to the detailed data has been accepted is deleted from the attachable file display section 1003 and is instead displayed in the attachment file display section 1004.

On the other hand, to cancel the designation of the attachment file, an instruction issued by depressing the delete button 1006 is accepted in the state that any of the electronic image data in the list displayed in the attachment file display section 1004 is being selected. The electronic image data for which the cancelation of the designation as the attachment file has been accepted is deleted from the attachment file display section 1004 and is instead displayed in the attachable file display section 1003.

The browse buttons 1007-1 and 1007-2 are the buttons which are used to browse the electronic image data displayed in the attachable file display section 1003 and the attachment file display section 1004, respectively. More specifically, when an instruction issued by depressing any of the browse buttons is accepted in the state that any of the electronic image data displayed in the corresponding section is being selected, the electronic image data being selected is displayed under the control of the CPU 201.

The OK button 1008 is the button to be used to settle the setting information input through the attachment file setting screen to end the process on the screen. On the other hand, the cancel button 1009 is the button to be used to invalidate the setting information input through the attachment file setting screen to end the process on the screen. These are the example of the attachment file setting screen 1000.

Turning to the description concerning FIG. 5, the input of the detailed data of the new application data from the user is accepted through the new application screen 900 in the step S511 and the attachment file setting screen 1000 by the client apparatus 102 (step S512). Then, the new application data including the detailed data is transmitted to the server apparatus 101 (step S513).

When the new application data is received from the client apparatus 102 (step S502), the received new application data is registered on an application data table provided in the external memory 211 by the CPU 201 of the server apparatus 101. For example, when the new application data is the data concerning the application for clearing the transportation cost, the new application data is registered on a transportation cost application data table 1300.

Here, the data constitution of the transportation cost application data table 1300 will be described with reference to FIG. 13. Namely, FIG. 13 is the view illustrating an example of the data constitution of the transportation cost application data table 1300.

As illustrated in FIG. 13, a user ID 1301, an application ID 1302, a detailed ID 1303, a use date 1304, a transportation means 1305, a use section 1306, a fare 1307, a round trip 1308, a scan ticket ID 1309, an attachment file 1310 and the like are set as data items on the transportation cost application data table 1300. Incidentally, various kinds of information and data input through the new application screen 900 in FIG. 9 and the attachment file setting screen 1000 in FIG. 10 are registered on the transportation cost application data table 1300.

The ID information for identifying the user who applies to clear the transportation cost is registered to the portion of the user ID 1301, and the ID information for discriminating the transportation cost application data is registered to the portion of the application ID 1302. Incidentally, when pluralities of detailed data are input on the new application screen in FIG. 9, the same ID information is registered as the application IDs for these data. The discrimination information for discriminating the detailed data in the same application data is registered to the portion of the detailed ID 1303.

The information input to the use date input section 901 of the new application screen 900 is registered to the portion of the use date 1304, the transportation means designated in the transportation means designation section 902 of the new application screen 900 is registered to the portion of the transportation means 1305, the information input to the use section input section 903 of the new application screen 900 is registered to the portion of the use section 1306, the information of the fare input to the fare input section 904 of the new application screen 900 is registered to the portion of the fare 1307, and the information concerning the round trip/one-way trip designated in the round trip designation section 905 of the new application screen 900 is registered to the portion of the round trip 1308.

The ID information for uniquely discriminating the scan ticket to be created in a later-described process is registered to the portion of the scan ticket ID 1309, and the electronic image data set as the attachment file for the detailed data on the attachment file setting screen 1000 is registered to the portion of the attachment file 1310. These are the data constitution on the transportation cost application data table 1300.

Turning to the description concerning FIG. 5, when the new application data received in the step S502 is registered to the application data table (step S503), then an attachment file setting process is performed by the CPU 201 of the server apparatus 101 (step S504). In any case, the detail of the attachment file setting process will be described with reference to FIG. 6.

Figure 6:
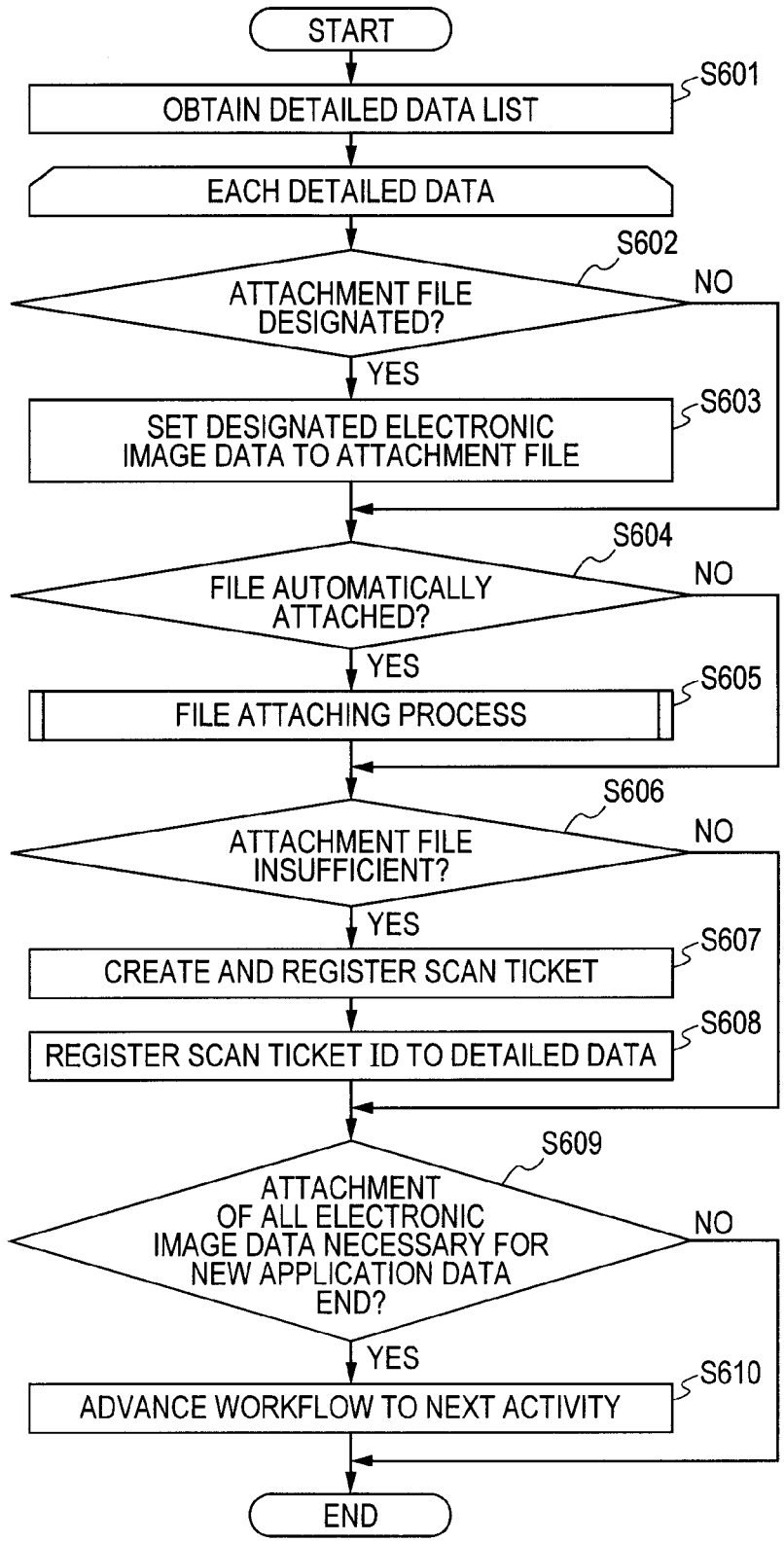
FIG. 6 is a flow chart illustrating the detail of an attachment file setting process of a step S504 illustrated in FIG. 5.

FIG. 6 is the flow chart illustrating the detail of the attachment file setting process to be performed in the step S504 of FIG. 5. Initially, all the detailed data included in the new application data are obtained by the CPU 201 of the server apparatus 101 (step S601). Then, later-described processes are performed to all the detailed data obtained in the step S601.

It is determined by the CPU 201 of the server apparatus 101 whether or not the attachment file has been designated to the detailed data obtained in the step S601 (step S602). Here, the designation of the attachment file to the detailed data is accepted by the client apparatus 102 in response to an instruction issued by the operation through the attachment file setting screen 1000 in FIG. 10, and the accepted designation is transmitted together with the application data from the client apparatus 102 in the step S513 of FIG. 5.

When it is determined, in the step S602, by the CPU 201 of the server apparatus 101 that the attachment file has been designated to the detailed data (YES), the process is moved to a step S603 to set the designated file to the attachment file of the detailed data. More specifically, the information of the electronic image data designated as the attachment file is registered to the portion of the attachment file 1310 of the data record indicating the detailed data on the transportation cost application data table 1300.

Then, it is determined in a step S604 whether or not attachment setting for automatically attaching the file to the application data has been effected. More specifically, it is determined by the CPU 201 whether, for the detailed data, the receipt image data automatic attachment designation section 1002 on the attachment file setting screen 1000 illustrated in FIG. 10 is checked (setting for automatically attaching the file is effected) or not checked (setting for automatically attaching the file is not effected).

When it is determined by the CPU 201 that the attachment setting for automatically attaching the file to the application data has been effected (YES in the step S604), the process is moved to a step S605 to actually perform a file attaching process. The file attaching process will be described in detailed with reference to FIG. 7.

Figure 7:
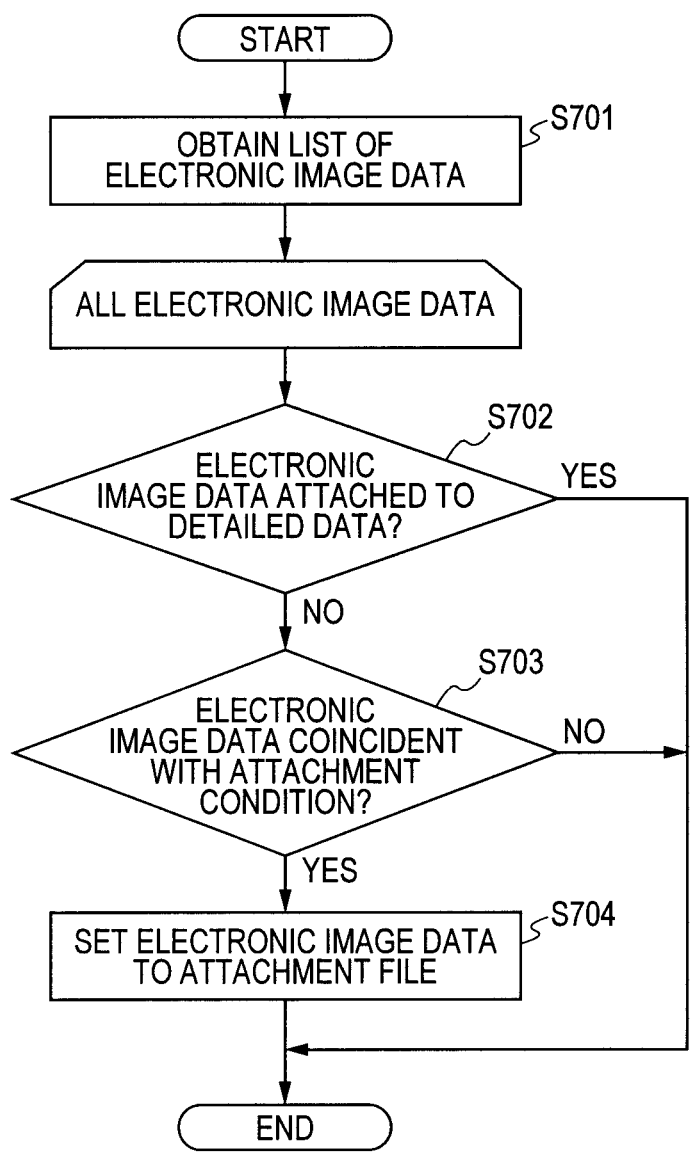
FIG. 7 is a flow chart illustrating the detail of a file attaching process of a step S605 illustrated in FIG. 6.

Hereinafter, the detail of the file attaching process to be performed in the step S605 of FIG. 6 will be described with reference to FIG. 7. Namely, FIG. 7 is the flow chart illustrating the detail of the file attaching process in the step S605 of FIG. 6.

Initially, the list of the electronic image data is obtained by the CPU 201 from the folder allocated to the user who performs the application using the workflow system, among the folders set in the server apparatus 101 (step S701). Subsequently, later-described processes in steps S702 to S704 are performed to all of the obtained electronic image data.

In the step S702, it is determined by the CPU 201 whether or not, among the electronic image data obtained in the step S701, the electronic image data, to which the later-described processes are not performed, has been set as the attachment file for another detailed data (step S702). More specifically, it is determined by the CPU 201 whether or not the relevant electronic image data has been registered as the attachment file to the attachment file 1310 of any of other detailed data on the transportation cost application data table 1300 stored in the external memory 211.

When it is determined as NO in the step S702, then it is further determined by the CPU 201 whether or not the relevant electronic image data is coincident with attachment conditions (step S703). More specifically, it is determined whether or not date information, fare information, transportation means information and the like obtained by performing an OCR (optical character recognition) process to the relevant electronic image data satisfy the attachment conditions of date information, fare information, transportation means information and the like of the detailed data.

When it is determined in the step S703 that the relevant electronic image data is coincident with attachment conditions (YES), the information of the image file (electronic image data) is registered to the attachment file 1310 of the record concerning the detailed data (step S704). Then, the above processes are performed to all the image files obtained in the step S701.

Incidentally, when the round trip setting of the detailed data being the process target of the attachment file automatic attachment setting indicates "one-way trip", it is of course possible to end the process at the stage that the one electronic image data has been attached. Moreover, when the round trip setting indicates "round trip", it is of course possible to end the process at the stage that the two electronic image data have been attached. These are the detail of the file attaching process to be performed in the step S605 of FIG. 6.

Turning to the description concerning FIG. 6, in a step S606, it is determined by the CPU 201 of the server apparatus 101 whether or not the attachment file is insufficient to the detailed data. For example, it is concretely determined that the attachment file is insufficient to the detailed data (YES), when the setting of the attachment file is not effected although the attachment file is required to the detailed data, when the result obtained by summing up the fares obtained by the OCR process to the attachment file does not reach the fare set in the detailed data, or the like. When it is determined that the attachment file is insufficient to the detailed data, the scan ticket to be used to attach the electronic image data to the detailed data is created, and the created scan ticket is registered to a scan ticket data table 1200 illustrated in FIG. 12 (step S607).

Here, the data constitution of the scan ticket data table 1200 will be described with reference to FIG. 12. As illustrated in FIG. 12, a scan ticket ID 1201, a kind 1202, a user ID 1203, and a scan setting 1204 are set as data items on the scan ticket data table 1200.

Moreover, a color/monochrome setting information 1204-1, a resolution setting information 1204-2, a file format information 1204-3, and a file transmission destination information 1204-4 are registered as the scan setting 1204.

More specifically, the ID information for uniquely discriminating the scan ticket is registered to the portion of the scan ticket ID 1201.

The kind of scan ticket is registered to the portion of the kind 1202. For example, a kind of scan ticket to be used to generate the electronic image data to be attached to transportation cost application data capable of being used by all the users is registered as "transportation cost application (general)", and a kind of scan ticket to be used to generate the electronic image data to be attached to advance payment application data is registered as "advance payment application (general)". Incidentally, when "individual" is registered to the portion of the kind 1202, it implies that the corresponding scan ticket is the scan ticket which is created according some sort of application by the user and used to generate an electronic image file (data) to be attached to the corresponding application data.

The user information of the user who can use the scan ticket is registered to the portion of the user ID 1203 of the relevant scan ticket. Therefore, the scan ticket of which the portion of the user ID 1203 does not have any information is the scan ticket which can be used by all users.

The scan setting information to be used when the scanning process is performed by the multifunction machine is registered to the portion of the scan setting 1204. More specifically, the setting of color/monochrome in the scanning is registered to the portion of the color/monochrome setting information 1204-1, the setting of resolution is registered to the portion of the resolution setting information 1204-2, the file format of the electronic image data to be generated by the scanning process is registered to the portion of the file format information 1204-3, and the transmission destination information of the electronic image data generated by the scanning process is registered to the portion of the file transmission destination information 1204-4.

Incidentally, "Server¥TRANSPORTATION COST¥<USER>" in the portion of the transmission destination information 1204-4 is the folder in the transportation cost folder set in the server apparatus 101, and implies that folder allocated to the user who is logging in to the multifunction machine 103 is set as the transmission destination. These are the data constitution on the scan ticket data table 1200 illustrated in FIG. 12.

Turning to the description concerning FIG. 6, after the scan ticket was issued in the step S607, the scan ticket ID 1201 for identifying the issued scan ticket is additionally registered to the scan ticket ID 1309 of the detailed data registered on the transportation cost application data table 1300 (step S608). Subsequently, the processes in the steps S602 to S608 are performed to all the detailed data included in the new application data.

After the processes in the steps S602 to S608 were performed to all the detailed data included in the new application data, the process is moved to a step S608 to determine whether or not the attachment of the required electronic image data to the new application data ends. In this process, it is concretely determined whether or not the electronic image data have been attached to, among the plurality of detailed data of the new application data, all the detailed data for which the attachment files are respectively required (that is, in cases where the bullet train, the airplane and the taxi are registered respectively to the portion of the transportation means 1305).

When it is determined as YES by the CPU 201 in the process of the step S609, the process is moved to a step S610 to move the workflow concerning the new application data to a next activity (e.g., an approval stage by an approving person). Turning to the description concerning FIG. 5, process result information is transmitted from the server apparatus to the client apparatus (step S505), and the screen is updated based on the received process result information on the client apparatus (step S514). These are the detail of the attachment file setting process to be performed in the step S504 of FIG. 5.

In the attachment file setting process, when the attachment file required and necessary for the new application data is not prepared at the time of the application, the scan ticket to be used to set the attachment file for the new application data is issued. Then, the document is read using the issued scan ticket, whereby the electronic image data to be attached to the application data is generated. On the other hand, when the attachment file required and necessary for the new application data has already been prepared, an unnecessary scan ticket is not issued. In any case, a process of attaching the electronic image data to the new application data by using the scan ticket will be described with reference to FIG. 8.

Figure 8:
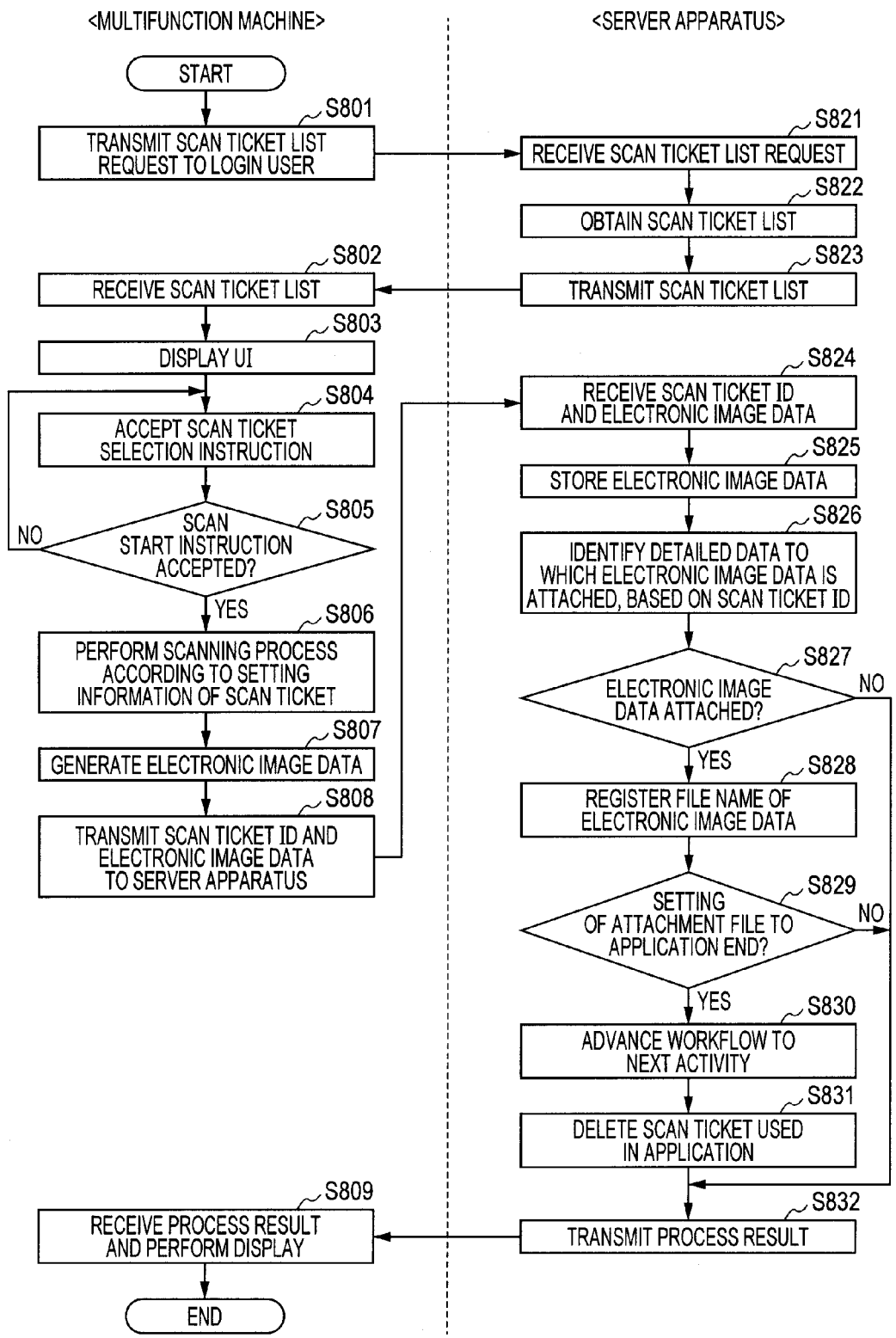
FIG. 8 is a flow chart illustrating the detail of a scanning process, using a scan ticket, of a step S404 illustrated in FIG. 4.

Subsequently, the detail of the scanning process using the scan ticket to be performed in the step S404 of FIG. 4 will be described with reference to FIG. 8. Namely, FIG. 8 is the flow chart illustrating the detail of the scanning process using the scan ticket. Incidentally, the program, stored in the external memory 211, for causing the CPU 201 of the server apparatus 101 to perform processes of steps S821 to S832 is loaded to the RAM 202, and these processes are actually performed by the CPU 201 under the control of the loaded program. Likewise, the program, stored in the HDD 304, for causing the CPU 301 of the multifunction machine 103 to perform processes of steps S801 to S809 is loaded to the RAM 302, and these processes are actually performed under the control of the loaded program.

Initially, before the scanning process is actually performed, a login process is performed by the CPU 301 of the multifunction machine 103 for the user who intends to use the multifunction machine 103. After the user logged in, when the "scan ticket button" provided on the operation screen displayed on the LCD unit of the operation unit 308 is depressed, a request of the list of the scan tickets corresponding to the user is transmitted to the server apparatus 101 (step S801). When the request is transmitted, also the user ID information for identifying the user who has logged in is transmitted to the server apparatus 101.

When the request of the list of the scan tickets transmitted from the multifunction machine 103 is received by the server apparatus 101 (step S821), the scan ticket corresponding to the user who has logged in to the multifunction machine 103 is obtained by extracting, from the scan ticket data table 1200 stored in the external memory 211, the record registered in the portion of the scan ticket ID 1201 based on the user ID information transmitted from the multifunction machine 103 (step S822). At this time, the scan ticket of which the user ID information is not registered in the portion of the user ID 1203 (for example, the scan tickets TK001 and TK002 in FIG. 12) is also obtained. Then, the list of the obtained scan tickets is transmitted to the multifunction machine 103 (step S823). At this time, the detailed data of the transportation cost application data corresponding to the scan ticket ID of the scan ticket obtained in the step S822 and registered in the portion of the scan ticket ID 1309 is also transmitted.

When the list of the scan tickets transmitted from the server apparatus 101 is obtained by the multifunction machine 103 (step S802), the operation screen 1100 used to select the scan ticket is displayed (UI display: step S803).

Here, an example of the operation screen 1100 to be displayed on the LCD unit of the operation unit 308 of the multifunction machine 103 in the step S803 of FIG. 8 will be described with reference to FIG. 11.

As illustrated in FIG. 11, an operation designation section 1101, a scan ticket list display section 1102 and a scan start button 1103 are set on the operation screen 1100.

The operation designation section 1101 is the designation section for designating the process to be performed using the multifunction machine 103. For example, when an instruction issued by depressing the "COPY" button set on the operation designation section 1101 is accepted, a not-illustrated screen used to perform detailed settings for a copying operation is displayed by the CPU 301 of the multifunction machine 103, and thus inputs of the detailed settings of the copying operation (e.g., the number of copies, double-sided/single-sided copy setting, copy density setting, and magnification percentage setting) are accepted. Then, when a copy start instruction is accepted, the copying process is actually started by the CPU 301.

Besides, when an instruction issued by depressing the "FAX" button is accepted, a not-illustrated screen used to perform detailed settings for facsimile transmission is displayed. Further, when an instruction issued by depressing the "PRINT STORED DATA" button is accepted, a not-illustrated screen used to perform a printing process to the print data stored in the memory of the multifunction machine 103 is displayed.

The operation designation section 1101 is commonly set to operation designation screens for performing various kinds of settings. By performing an instruction issued by depressing a "SCAN TICKET" button 1101-1 set on the operation designation section 1101, it is possible to instruct the CPU 301 to start the process illustrated in FIG. 8.

The scan ticket list display section 1102 is the display section for displaying the scan ticket capable of being used by the user who has logged in to the multifunction machine 103. When an instruction for the scan ticket displayed on the scan ticket list display section 1102 is accepted, selection of the scan ticket to be used is accepted. Here, it is controlled to display a selected scan ticket 1102-1 so that the user can recognize that the relevant scan ticket is being selected.

The scan start button 1103 is the button to be used to instruct the CPU 301 to start the scanning process using the scan ticket of which the selection is accepted in the scan ticket list display section 1102 for the CPU 301. These are the example of the operation screen 1100 illustrated in FIG. 11.

Turning to the description concerning FIG. 8, after the operation screen 1100 illustrated in FIG. 11 was displayed, the selection instruction of the scan ticket is accepted by the CPU 301 of the multifunction machine 103 in accordance with the operation instruction from the operation screen (step S804). Subsequently, when a scan start instruction input based on an instruction issued by depressing the scan start button 1103 on the operation screen 1100 is accepted (YES in the step S805), the scanning process is performed according to the scan settings (for example, the settings of the color/monochrome setting information 1204-1 and the resolution setting information 1204-2) set on the scan ticket of which the selection instruction was accepted in the step S804 (step S806), and the electronic image data of the file format set in the portion of the file format information 1204-3 is generated (step S807). Then, the scan ticket ID of the scan ticket selected in the step S804 and the generated electronic image data are transmitted to the server apparatus 101 (step S808).

When the scan ticket ID and the electronic image data from the multifunction machine 103 are received by the CPU 201 of the server apparatus 101 (step S824), the received image data is stored to the registration destination, registered in the portion of the file transmission destination information 1204-4, of the scan ticket identified by the received scan ticket ID (step S825).

After the electronic image data was stored, the detailed data to which the electronic image data received from the multifunction machine 103 is to be attached is identified by the CPU 201 of the server apparatus 101 (step S826). More specifically, the detailed data is identified by searching for the record that the scan ticket ID received from the multifunction machine 103 in the step S824 has been registered to the portion of the scan ticket ID 1309 on the transportation cost application data table 1300.

Then, when the detailed data to which the electronic image data is to be attached is identified in the step S826 and it is determined to attach the electronic image data to the identified detailed data (YES in the step S827), the file name of the electronic image data is registered to the portion of the attachment file 1310 of the detailed data (step S828). Incidentally, when the scanning process using the scan ticket for which the kind other than "individual" is set in the portion of the kind 1202 is performed by the multifunction machine 103, the electronic image data is not attached to the detailed data in this process. Moreover, the electronic image data which is generated as the result of the scanning process using the scan ticket for which "transportation cost application (general)" is set in the portion of the kind 1202 in the multifunction machine 103 is the electronic image data which can be attached to the detailed data in the process of selecting the attachment data using the attachment file setting screen illustrated in FIG. 10.

After the process in the step S828 was performed, it is determined by the CPU 301 of the multifunction machine 103 whether or not the setting of the attachment file for the application data including the detailed data to which the electronic image data was attached in the step S828 ends (step S829). When it is determined that the setting of the attachment file ends (YES in the step S829), the process is moved to the step S830 to move the workflow to a next activity. Then, the scan ticket used in the application is deleted (step S831).

When it is determined as NO in the step S827 or it is determined as NO in the step S829 by the CPU 301, or after the process in the step S831 is performed, the process is moved by the CPU 301 to the step S832 to transmit a process result to the multifunction machine 103 (step S832). Then, the process result from the server apparatus 101 is received by the CU 301 of the multifunction machine 103, and the screen according to the received process result is displayed (step S809). These are the detail of the scanning process using the scan ticket to be performed in the step S404 of FIG. 4.

As described above, according to the present invention, when the application, such as the application for clearing the transportation cost, for which the electronic image file of the receipt or the like indicating that the transportation means was actually used is required is performed using the workflow system, the scan ticket to be used to attach the electronic image file to the application is issued, whereby it is possible to generate the electronic image data and attach the generated electronic image data to the application data according to the setting of the issued scan ticket. Thus, after the application data in the workflow system was generated by the user, it is unnecessary to perform any designation process of the electronic image data to be attached to the application data, whereby it is possible to reduce erroneous attachment or the like of the electronic image data.

Moreover, according to the present invention, when the image data to be attached to the application data is insufficient, the scan ticket to be used for attaching the electronic image data to the application data is generated or issued. Thus, it is possible to prevent that the scan ticket is unnecessarily generated or issued, and it is therefore possible to reduce erroneous selection of the scan ticket by the user.

The present invention may be applied to a system consisting of a plurality of devices or to an apparatus comprising a single device. Moreover, it is needless to say that the present invention is applicable to a case where the functions of the above embodiment are achieved by supplying a program to the system or the apparatus. In this case, by reading a recording medium, on which the program for achieving the present invention has been stored, to the system or the apparatus, it is possible for the system or the apparatus to have the above-described effects of the present invention.

Furthermore, by downloading the program for achieving the present invention from a server, a database or the like on a network and reading the downloaded program, it is possible for the system or the apparatus to have the above-described effects of the present invention.

Incidentally, all of constitutions obtained by combining the above-described embodiment and its modifications are included in the present invention.

OTHER EMBODIMENTS

Aspects of the present invention can also be realized by a computer of a system or an apparatus (or devices such as a CPU or an MPU) that reads out and executes a program recorded on a memory device to perform the functions of the above-described embodiment, and by a method, the steps of which are performed by a computer of a system or an apparatus by, for example, reading out and executing a program recorded on a memory device to perform the functions of the above-described embodiment. For this purpose, the program is provided to the computer for example via a network or from a recording medium of various types serving as the memory device (e.g., a computer-readable medium). In such a case, the system or the apparatus, and the recording medium where the program is stored, are included as being within the scope of the present invention.

While the present invention has been described with reference to the exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-236910, filed Oct. 21, 2010, which is hereby incorporated by reference herein in its entirety.

What is claimed is:

1. An information processing system which includes a management server and an image processing apparatus having an image reading mechanism, wherein,
    the management server comprises:
        a first accepting unit constructed to accept data from a client apparatus;
        a first determining unit constructed to determine whether or not an attachment file to be attached to the data accepted by the first accepting unit is insufficient;
        a first generating unit constructed to, according to the first determining unit determining that the attachment file to be attached to the data accepted by the first accepting unit is insufficient, generate a scan ticket to be used to generate image data serving as the attachment file by the image reading mechanism of the image processing apparatus;
        an associating unit constructed to associate the scan ticket generated by the first generating unit with the data for which the attachment file to be attached thereto is insufficient; and
        a first transmitting unit constructed to transmit the scan ticket to the image processing apparatus in response to a request from the image processing apparatus,
    wherein the image processing apparatus comprises:
        a request unit constructed to transmit the request of the scan ticket to the management server;
        a second accepting unit constructed to accept, from among scan tickets transmitted by the first transmitting unit in response to the request by the request unit, designation of a scan ticket to be used in an image reading process;
        a second generating unit constructed to perform the image reading process with the image reading mechanism by using the scan ticket accepted by the second accepting unit, and generate image data; and
        a second transmitting unit constructed to transmit the image data generated by the second generating unit to the management server, and
    wherein the management server further comprises an attaching unit constructed to attach the image data transmitted from the image processing apparatus by the second transmitting unit to the data associated with the scan ticket used in the generating of the image data.

2. The information processing system according to claim 1, wherein the management server further comprises:
    a second determining unit constructed to determine whether or not attaching of attachment data required for the data has ended; and
    a transitioning unit constructed to, in a case where it is determined by the second determining unit that the attaching of the attachment data has ended, transition the data to a next process.

3. The information processing system according to claim 1, wherein the first accepting unit further accepts, together with the data, designation of the attachment data to be attached to the data.

4. The information processing system according to claim 1, wherein reading setting in case of performing the image reading process by the image processing apparatus, a file format of the image data generated by the image reading process, and a transmission destination of the generated image data are defined in the scan ticket.

5. An information processing method which is performed in an information processing system which includes a management server and an image processing apparatus having an image reading mechanism, wherein, the management server performs:
a first accepting step of accepting data from a client apparatus;
a first determining step of determining whether or not an attachment file to be attached to the data accepted in the first accepting step is insufficient;
a first generating step of, according to the first determining step determining that the attachment file to be attached to the data accepted in the first accepting step is insufficient, generating a scan ticket to be used to generate image data serving as the attachment file by the image reading mechanism of the image processing apparatus;
an associating step of associating the scan ticket generated in the first generating step with the data for which the attachment file to be attached thereto is insufficient; and
a first transmitting step of transmitting the scan ticket to the image processing apparatus in response to a request from the image processing apparatus, wherein the image processing apparatus performs:
a request step of transmitting the request of the scan ticket to the management servers;
a second accepting step of accepting, from among scan tickets transmitted in the first transmitting step in response to the request in the request step, designation of a scan ticket to be used in an image reading process;
a second generating step of performing the image reading process with the image reading mechanism by using the scan ticket accepted in the second accepting step, and generating image data; and
a second transmitting step of transmitting the image data generated in the second generating step to the management server, and wherein the management server further performs an attaching step of attaching the image data transmitted from the image processing apparatus to the data associated with the scan ticket used in the generating of the image data.

6. A non-transitory computer-readable storage medium storing a computer program to be executed in an information processing apparatus which is communicable to a client apparatus and an image processing apparatus having an image reading mechanism, wherein the computer program causes the information processing apparatus to perform:
a first accepting step of accepting data from the client apparatus;
a first determining step of determining whether or not an attachment file to be attached to the data accepted by the first accepting step is insufficient;
a first generating step of according to the first determining determining that the attachment file to be attached to the data accepted by the first accepting step is sufficient, generating a scan ticket to be used to generate image data serving as the attachment file by the image reading mechanism of the image processing apparatus;
an associating step of associating the scan ticket generated by the first generating step with the data for which the attachment file to be attached thereto is insufficient;
a first transmitting step of transmitting the scan ticket to the image processing apparatus in response to a request from the image processing apparatus;
a receiving step of receiving image data generated by the image processing apparatus as a result of a reading process with the reading mechanism by using the scan ticket transmitted by the first transmitting step; and
an attaching step of attaching the image data received by the receiving step to the data associated with the scan ticket used in the reading process by the image processing apparatus.

7. An information processing apparatus which is communicable to a client apparatus and an image processing apparatus having a reading mechanism, the information processing apparatus comprising:
a first accepting unit constructed to accept data from the client apparatus;
a first determining unit constructed to determine whether or not an attachment file to be attached to the data accepted by the first accepting unit is insufficient;
a first generating unit constructed to, according to the first determining unit determining that the attachment file to be attached to the data accepted by the first accepting unit is insufficient, generate a scan ticket to be used to generate image data serving as the attachment file by the image reading mechanism of the image processing apparatus;
an associating unit constructed to associate the scan ticket generated by the first generating unit with the data for which the attachment file to be attached thereto is insufficient;
a first transmitting unit constructed to transmit the scan ticket to the image processing apparatus in response to a request from the image processing apparatus;
a receiving unit constructed to receive image data generated by the image processing apparatus as a result of a reading process with the reading mechanism by using the scan ticket transmitted by the first transmitting unit; and
an attaching unit constructed to attach the image data received by the receiving unit to the data associated with the scan ticket used in the reading process by the image processing apparatus.

8. The information processing system according to claim 1, wherein:
the data accepted by the first accepting unit is data for applying to clear transportation costs, and
the attachment file to be attached to the data is electronic image data indicating a receipt of transportation costs.

9. The information processing system according to claim 8, wherein the first determining unit determines that the attachment file is insufficient, in a case where a fare of the transportation costs obtained by performing an OCR (optical character recognition) process to the attachment file already attached to the data for clearing transportation costs accepted by the first accepting unit does not satisfy a fare of the transportation costs set in the data for clearing transportation costs.

10. An information processing method which is performed in an information processing apparatus which is communicable to a client apparatus and an image processing apparatus having a reading mechanism, the information processing method comprising:

a first accepting step of accepting data from the client apparatus;

a first determining step of determining whether or not an attachment file to be attached to the data accepted in the first accepting step is insufficient;

a first generating step of, according to the first determining step determining that the attachment file to be attached to the data accepted by the first accepting step is insufficient, generating a scan ticket to be used to generate image data serving as the attachment file by the image reading mechanism of the image processing apparatus;

an associating step of associating the scan ticket generated in the first generating step with the data for which the attachment file to be attached thereto is insufficient;

a first transmitting step of transmitting the scan ticket to the image processing apparatus in response to a request from the image processing apparatus;

a receiving step of receiving image data generated by the image processing apparatus as a result of a reading process with the reading mechanism by using the scan ticket transmitted in the first transmitting step; and an attaching step of attaching the image data received in the receiving step to the data associated with the scan ticket used in the reading process by the image processing apparatus.

* * * * *